April 30, 1940.    L. C. FOGARTY    2,198,664
CORD ATTACHMENT
Filed Jan. 14, 1938
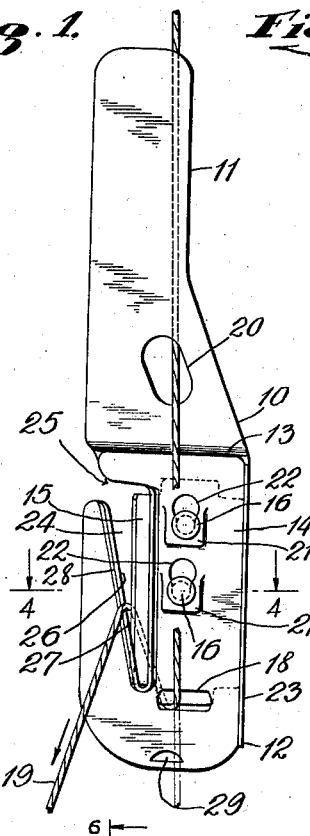
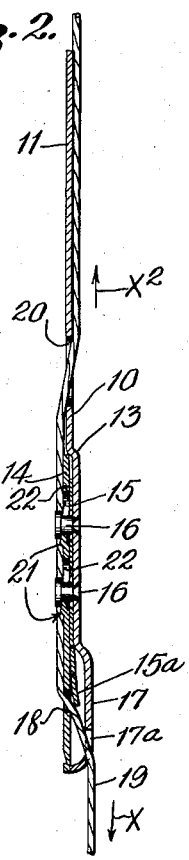
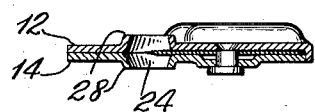
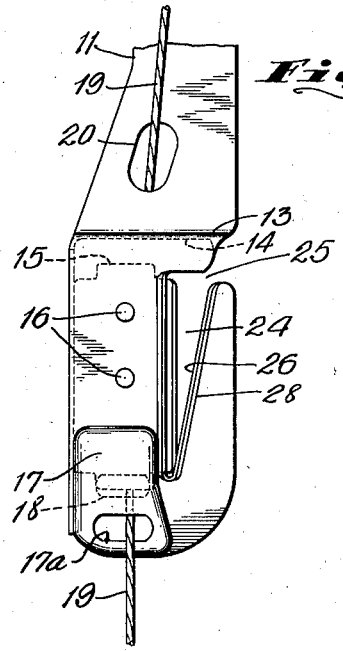
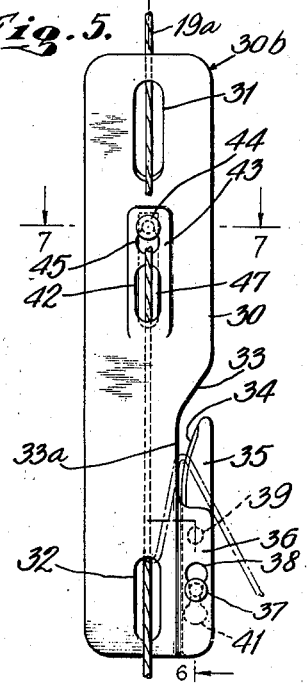
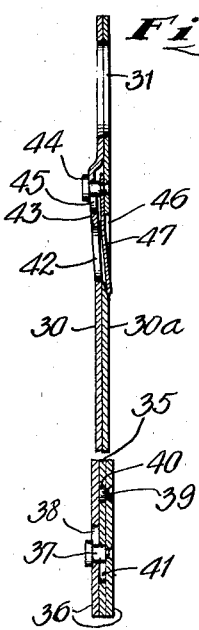
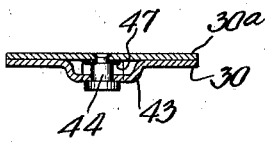
INVENTOR
LILLIAN C. FOGARTY
BY
ATTORNEY Patented Apr. 30, 1940

2,198,664

UNITED STATES PATENT OFFICE 2,198,664

CORD ATTACHMENT

Lillian C. Fogarty, Glen Cove, N. Y.

Application January 14, 1938, Serial No. 184,938

6 Claims. (Cl. 30—127)

This invention relates to attachments for use with string, cord and the like, such as commonly used in tying packages, or in connection with strands of this general type and kind regardless of the use thereof; and the object of the invention is to provide an attachment through which the cord or strand is threaded, and means being provided to engage the cord or strand to retain the attachment against displacement therefrom while at the same time permitting movement of the attachment longitudinally of the cord or strand as the same is consumed; and especially in providing an attachment of this kind having a cutting or severing means for cutting the cord at any desired position beyond the attachment; a further object being to provide a device of the character described including a handle portion by means of which the attachment may be conveniently handled in the operation of tying a package, and efficiently used in the severing of the cord after the package has been tied; and with these and other objects in view, the invention consists in a device of the class and for the purpose specified which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a face view of one form of a device which I employ, indicating the method of its use.

Fig. 2 is a longitudinal sectional view through the device shown in Fig. 1, illustrating the same attached to and supported by a cord or strand.

Fig. 3 is a rear view of the device as seen in Figs. 1 and 2, with part of the construction broken away.

Fig. 4 is a partial section on the line 4—4 of Fig. 1, on an enlarged scale.

Fig. 5 is a view similar to Fig. 1, showing a modified form of construction.

Fig. 6 is a section substantially on the line 6—6 of Fig. 5, with part of the structure broken away; and, Fig. 7 is a section on the line 7—7 of Fig. 5, on an enlarged scale.

The device as shown in Figs. 1 to 4 inclusive, comprises an elongated body portion 10 which is preferably formed from sheet material, one end 11 of the body portion being shaped to form a handle for the device, and the other end 12 forming a blade supporting part which is preferably offset with respect to the plane of the handle portion 11 as seen at 13, and also to form a shoulder against which a blade retaining plate 14 is adapted to rest in supporting a razor blade 15 between the end portion 12 and the plate 14. The end portion 12 is provided with spaced headed rivets 16, the heads of which are of such size as to permit the free passage of conventional apertures in a razor blade over said headed pins, to detachably support the razor blade in connection with the portion 12 of the device when the plate 14 is removed; it being understood that the pins 16 cooperate with two of the conventional three apertures provided in the usual double-edged razor blades.

The outer end of the blade supporting portion 12 is also offset as seen at 17, note Figs. 2 and 3 of the drawing; to form a relatively large chamber in which the end portion 15a of the razor blade is free to flex; the blade normally resting adjacent an aperture 18 formed in the plate 14 so as to apply tension to a string or cord 19 in passing through the aperture 18 into the chamber of the offset portion 17, and then out through the aperture 17a as clearly illustrated in Figs. 2 and 3 of the drawing. The purpose of this construction is to provide a tensional grip or clasping means for retaining and supporting the cutter attachment upon the cord or strand 17, against movement in the direction of the arrow X thereof, while at the same time permitting free movement of the attachment in the direction of the arrow X2, as illustrated in Fig. 2 of the drawing. The cord or strand also passes through an elongated aperture 20 formed in the handle portion so as to aid in supporting the attachment in a plane substantially paralleling the cord in the manner illustrated.

The plate 14 is provided with two outwardly pressed cam surfaces 21, having key-hole apertures 22 formed therein to receive the headed pin 16; the surfaces 21 engaging the under sides of the heads of the pin 16 in clamping the plate 14 in engagement with the end portion 12 and the razor blade 15 disposed between said parts. One side edge of the blade supporting end portion 12 of the device, has an angularly extending flange 23 which serves to guide the mounting of the plate 14 upon said end portion, and also forms a backing for one edge of the razor blade 15; the other edge thereof being exposed in a V-shaped aperture 24 formed in the end portion 12 and in the plate 14 and opening through the side of the device as seen at 25, to permit the free passage of the cord or strand 19 into the V-shaped recess 24 and to engage the edge of the razor blade arranged therein. It will be apparent that the angular wall 26 of the parts 12, 14, cooperates with the straight edge of the blade to form a contracted point of intersection as at 27 which insures the easy cutting or severing of the twine, cord or other strand. In this connection, it will be understood that the various apertures and openings of the entire device are made sufficiently large to accommodate heavy cords or strands, as well as lighter and even thread-like strands in connection with which the device may be used.

It will also appear from a consideration of Fig. 4 of the drawing, that the edges of the parts 12 and 14, where they form the boundaries of the opening 24, have outwardly extending flanges 28 which serve as guards to prevent the finger of a hand from coming in contact with the exposed edge of the razor blade 15. It is also preferred that the plate 14 be provided with a recess 29 adjacent the outer end thereof to facilitate detachment of the plate 14 at will, in the renewal or replacement of the blade 15.

In the use of the device, it will be understood that the attachment may be grasped in the hand in such manner as to permit free movement of the attachment longitudinally of the strand 19 in the direction of the arrow X2 in the operation of tying a package. After the package is properly tied, with the device still in the hand, the attachment may be operated to sever the strand near the package by simply hooking the strand into the V-shaped chamber 24, and then pulling the attachment away from the package. With a little practice, this operation may be accomplished at high speed and will save considerable time in the tying of bundles, especially by clerks employed for this purpose.

It will appear that one of the distinctive features of the invention resides in the fact that at all times, the cutting attachment is maintained upon the strand so that displacement of the attachment from the cord or strand is not possible, unless it is the intent or desire to remove the same for any purpose whatever.

In Figs. 5, 6, and 7, I have shown a slight modification of the invention wherein the device is formed from two substantially similar elongated parts 30, 30a of suitable sheet material, each part having elongated apertures 31, 32 at the end portions thereof through which the cord or strand 19a is adapted to be threaded; both parts being recessed at one side as seen at 33, to give access to the cutting edge 34 of a blade 35. The blade 35 is detachably supported between offset portions 36 of the parts 30, 30a; one offset portion having a headed pin 37 secured thereto and adapted to cooperate with a key-hole aperture 38 in the other portion in clamping the parts 30, 30a together and to secure the blade 35 in position. Another pin 39 is provided in the first named offset portion 36 and is adapted to register with an aperture 40 formed in the blade 35; the blade having a key-hole aperture 41 cooperating with the pin 37 in detachably coupling the blade with the part 30a as well as with respect to the part 30. The pin 39 serves to properly aline the blade 35 between the parts 30, 30a, which is also accomplished by the seating of the shank of the blade within and between the offset portions 36.

The cutting edge 34 of the blade cooperates with the edge 33a of the recess 33 in forming a substantially V-shaped channel facilitating the shearing or cutting of a strand which is movable downwardly into said recess in the manner illustrated in dotted lines in Fig. 5 of the drawing.

The part 30 is provided with an elongated aperture 42 which is arranged in an outwardly extended cam surface 43 on said part, which surface cooperates with a headed pin or rivet 44 secured to the part 30a, in clamping parts 30, 30a together to frictionally retain said parts against displacement; it being understood that the pin 37 also establishes a means of alining the parts, as will be apparent. The outwardly extending surface 43 is provided with a key-hole aperture 45 through which the head of the pin 44 is adapted to pass in detaching the parts 30, 30a.

The part 30a has an elongated aperture 46 in registering alinement with and of greater length than the aperture 42. Supported in connection with the part 30a by means of the pin or rivet 44, is a spring finger 47, the free end of which extends outwardly through the aperture 46 and rests upon the outer surfaces of the part 30a so that the looping of the strand 19a through the apertures 42, 46, will cause the spring arm 47 to tensionally engage the strand 19a to prevent movement of the device in a direction similar to the direction of the arrow X, on the strand 19a while at the same time permitting the free movement of the attachment in the opposite direction on said strand. It will thus be seen that accidental displacement of the attachment from the strand shown in Figs. 5 to 7 is prevented as with the structure shown in the other figures.

With the construction shown in Figs. 5 to 7 inclusive, it will be apparent that the strand 19a as seen in Fig. 5, first passes forwardly through the aperture 31 and then backwardly through the apertures 42, 46 and then again forwardly through the aperture 42. This serves to maintain the attachment in a position substantially paralleling the longitudinal plane of the strand, and the end portion 30b of the device will form a handle member substantially similar to the handle member 11 of the device shown in Fig. 1.

Aside from the contour of the parts 30, 30a of the device shown in Figs. 5, 6 and 7, it will appear that this device differs from the structure shown in the other figures in the use of what might be termed a special blade; instead of adapting the device for use in discarded razor blades which have served their useful purpose in shaving; and at the same time a special spring finger or catch device 47 is employed rather than utilizing the resiliency of one edge portion of the blade itself, as in Figs. 1 to 4 inclusive.

However, in both forms of the device illustrated, means is provided for coupling the cutter attachment with the strand which is in use, and for retaining the attachment in predetermined position with respect to the strand and against movement accidentally in one direction thereon. It will appear that other adaptations of these distinctive structural features of the invention may be made within the scope of the appended claims.

Having fully described my invention, what I claim as new and desire to secure by Letters Patent is:

1. A cord cutting attachment comprising an elongated flat member, one end of which forms a handle portion and the other a blade supporting portion, said blade supporting portion comprising detachably and slidably coupled plates having registering lugs and apertures, one straight side edge of said member having substantially centrally thereof intermediate said handle and blade supporting portions an indentation forming an internal edge portion on said member extending substantially lengthwise thereof, a blade supported between said plates and on said lugs in position to form an acute angle with the internal edge portion of said member, the sides of said acute angle diverging toward the handle portion of said member, spaced apertures in the handle and blade supporting portions of said member through which a cord may be threaded, and means adjacent one of said apertures permitting movement of the cord in one direction but preventing movement thereof in the other direction.

2. A cord cutting attachment comprising an elongated flat member, one end of which forms a handle portion and the other a blade supporting portion, said blade supporting portion comprising detachably and slidably coupled plates having registering lugs and apertures, one side edge of said member intermediate said handle and blade supporting portions having an indentation forming an internal edge portion on said member extending substantially lengthwise thereof, a two edged razor blade supported between said plates and on said lugs in position to form an acute angle with the internal edge portion of said member, the sides of said acute angle diverging toward the handle portion of said member, spaced apertures in the handle and blade supporting portions of said member through which a cord may be threaded, means adjacent one of said apertures permitting movement of the cord in one direction but preventing movement thereof in the other direction, and said means comprising the flexed edge of one end of said blade.

3. A cord cutting attachment comprising an elongated flat member, one end of which forms a handle portion and the other a blade supporting portion, said blade supporting portion comprising detachably and slidably coupled plates having registering apertures and lugs, and one straight side edge of said blade supporting portion adjacent said handle portion having an opening extending inwardly and longitudinally of said member forming a hook-shaped contour of said blade supporting portion, a blade mounted on said lugs between said detachably and slidably coupled plates and arranged to form an acute angle between one edge of said opening and an exposed edge portion of said blade, the sides of said angle diverging toward the handle portion of said member, apertures in the handle and blade supporting portions forming guide means by which the member is attached to a cord, and the aperture in the blade supporting end of said member being adjacent one end of the blade supported thereby and in spaced relation to the exposed edge portion of said blade.

4. A cord cutting device of the class described adapted to be supported on a cord and to be movable in one direction thereon, said device including an elongated plate member, a handle portion at one end of said member and a blade supporting portion at the other end thereof, said device further including a second plate member registering with the blade supporting portion of said first named member, coacting lugs and apertures on said plate members providing slidable engagement therebetween, said lugs being adapted to support an apertured blade between said plates, one straight side edge of said device having an indentation in the blade supporting portion thereof adjacent the handle portion, said indentation forming an enlarged opening through said blade supporting portion extending longitudinally and tapered toward the end thereof and said indentation forming means for shielding and at the same time effectively exposing one edge of a blade supported in said device.

5. A cord cutting device of the class described adapted to be slidably supported on a cord, said device including an elongated plate member, a handle portion at one end of said member and a blade supporting portion at the other end thereof, said device further including a second plate member registering with the blade supporting portion of said first named member, coacting lugs and apertures on said plate members providing slidable engagement therebetween, said lugs being adapted to support an apertured razor blade between said plates, one straight side edge of said device having an indentation in the blade supporting portion thereof adjacent the handle portion, said indentation forming an enlarged opening through said blade supporting portion extending longitudinally and tapered toward the end thereof, said indentation forming means for shielding and at the same time effectively exposing one edge of a blade supported in said device, said device having spaced apertures forming means for supporting the same on a cord, and the flexed edge of one end of the razor blade supported in said device registering with one of said apertures thereby providing for movement of the device in one direction only on said cord.

6. A cord cutting device of the class described comprising a pair of detachably coupled plates, said plates having registering lugs and apertures providing slidable engagement therebetween, an apertured blade detachably supported on a pair of lugs at one end portion of said device, each of said plates having a cut-away portion opening substantially centrally of one straight side edge of said device and extending longitudinally of said device forming internal edge portions, the edge of said blade being exposed longitudinally of said cut-away portion and forming with an opposed internal edge of said cut-away portion an acute angle converging in the direction of the blade supporting end of said device, and means on said device retaining a cord against displacement therefrom.

LILLIAN C. FOGARTY.